(12) United States Patent
Little et al.

(10) Patent No.: US 8,109,773 B1
(45) Date of Patent: Feb. 7, 2012

(54) MULTI-FUNCTION CARD CONNECTOR

(75) Inventors: Terrance F. Little, York, PA (US);
Kuo-Chun Hsu, New Taipei (TW);
Hsueh-Lung Hsiao, New Taipei (TW);
Hung-Yang Yeh, New Taipei (TW)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 13/006,414

(22) Filed: Jan. 13, 2011

(51) Int. Cl.
*H01R 13/62* (2006.01)
(52) U.S. Cl. ........ 439/159; 439/64; 439/928.1; 439/946
(58) Field of Classification Search .................... 439/62, 439/64, 152, 159, 188, 630–632, 928.1, 946, 439/946.2
See application file for complete search history.

(56) References Cited

U.S. PATENT DOCUMENTS

| 6,520,784 B2 * | 2/2003 | Ito et al. ........................ 439/159 |
| 2011/0008982 A1 * | 1/2011 | Tung et al. ..................... 439/152 |

FOREIGN PATENT DOCUMENTS

CN 200610093206 7/2009

* cited by examiner

*Primary Examiner* — James Harvey
(74) *Attorney, Agent, or Firm* — Wei Te Chung; Andrew C. Cheng; Ming Chieh Chang

(57) ABSTRACT

A card connector (100) includes an insulative housing defining a card receiving space; a plurality of contacts (2) supported by the insulative housing and accommodated in the card receiving space, said the plurality of contacts divided into two sets and arranged along a longitudinal direction, said contacts adapted for mating with a first type card and a second type card, respectively; and an ejecting mechanism (3) mounted to the insulative housing, the ejecting mechanism (3) including a first slider (31), a second slider (31'), a follower (32) and a spring (33), the first slider mounted to the second slider and capable of moving on the second slider to carry one of the two cards, and the first slider and the second slider together to carry the other of the two card.

20 Claims, 15 Drawing Sheets

MULTI-FUNCTION CARD CONNECTOR

BACKGROUND OF THE INVENTION

1. Field of the Invention

The present invention relates to a card connector, especially to a multi-function card connector.

2. Description of Related Art

With development of consuming products, such as portable telephones, digital cameras, PDA (Personal Digital Assistance), portable audio and the like, a lot of different kinds of cards, such as a SD (Super Density, Secure Digital) card, a MMC (Multi-Media Card), a SM (Smart Media) card, a MS Duo (Memory Stick Duo) card and a XD (XD-picture) card, are widely used in the field of the consuming products. Therefore, different card connectors are needed to load different cards. However, one card connector only loads one corresponding card, the above consuming product needs to be designed with different card connectors which occupy too much space and increase cost of the consuming product. Thus, a card connector which can load some different cards is required.

At present, a card connector which can load different cards has a plurality of inserting cavities for receiving different cards. There is a card slider or carriage mounted to a lateral side of the connector to carry and eject the card. For example, CN patent No. 200610093206 issued on Jul. 8, 2009 discloses a card connector for mating with different kinds of cards. A slider is employed to push out the card from the card connector. The slider has a first, second and third guiding portions for guiding the first, second and third cards in a card ejecting direction. However, as different cards have different form facts, and it may be not easily to carry the different cards by one slider, especially the card has a big form factor.

Hence, an improved card connector is required to overcome the problems of the prior art.

SUMMARY OF THE INVENTION

An object of the present invention is to provide a compact card connector which is adapted for different kinds of cards.

Accordingly, to achieve above-mentioned object, a card connector comprises an insulative housing defining a card receiving space; a plurality of contacts supported by the insulative housing and accommodated in the card receiving space, said plurality of contacts divided into two sets and arranged along a longitudinal direction, said contacts adapted for mating with a first type card and a second type card, respectively; and an ejecting mechanism mounted to the insulative housing, the ejecting mechanism including a first slider, a second slider, a follower and a spring, the first slider mounted to the second slider and capable of moving on the second slider to carry one of the two cards, and the first slider and the second slider together to carry the other of the two card.

The detailed features of the present invention will be apparent in the detailed description with appropriate reference to the accompanying drawings.

DETAILED DESCRIPTION OF THE INVENTION

Figure 1:
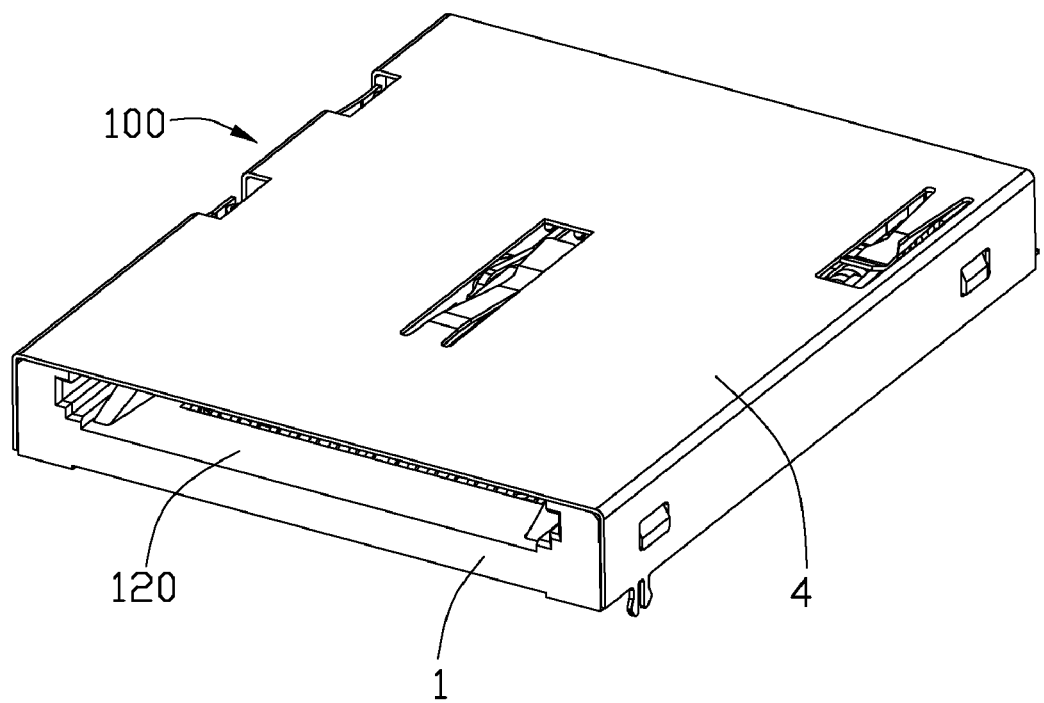
FIG. 1 is an assembled, perspective view of the card connector.
Figure 2:
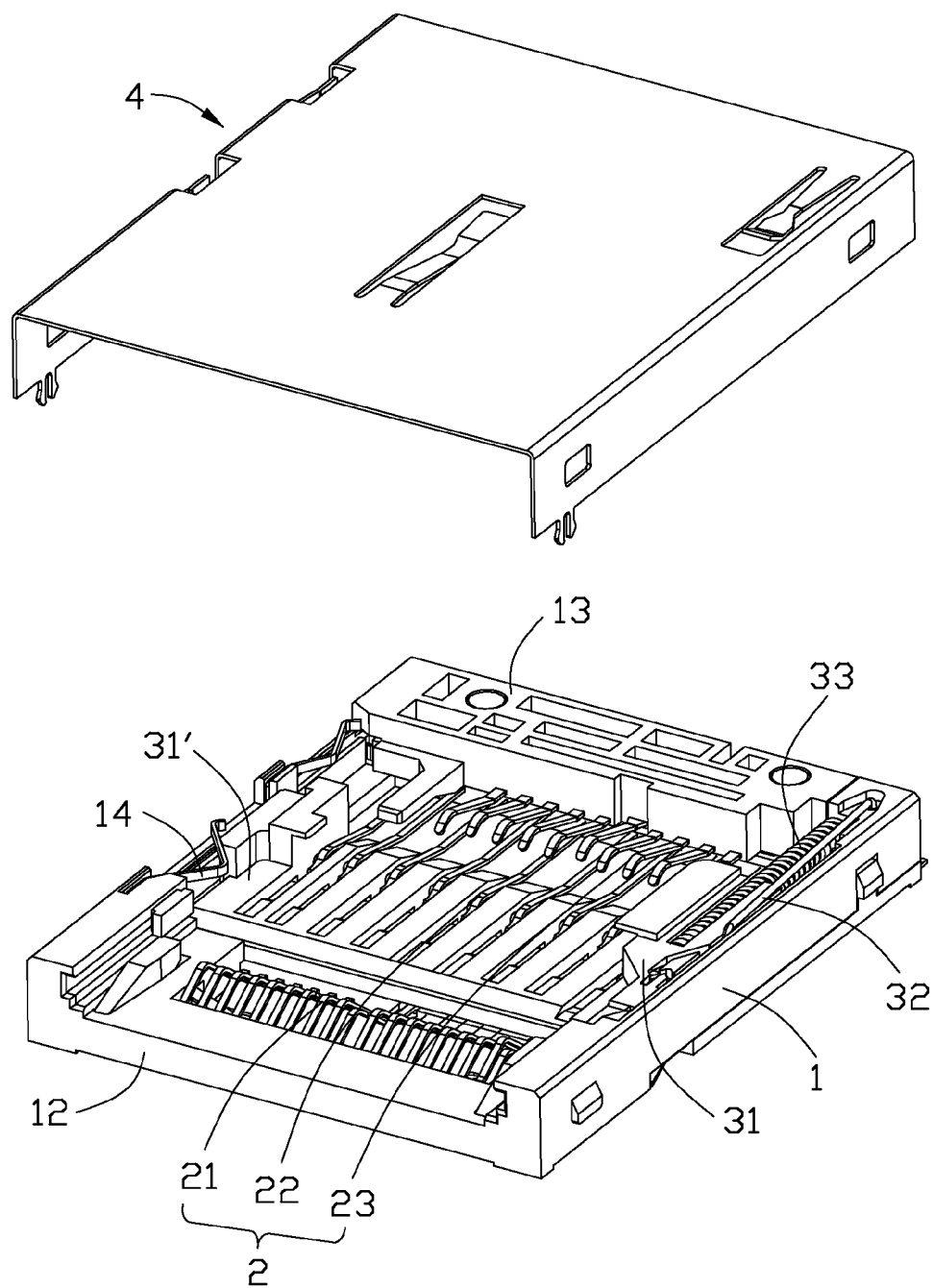
FIG. 2 is a partially exploded perspective view of the card connector shown in FIG. 3.
Figure 3:
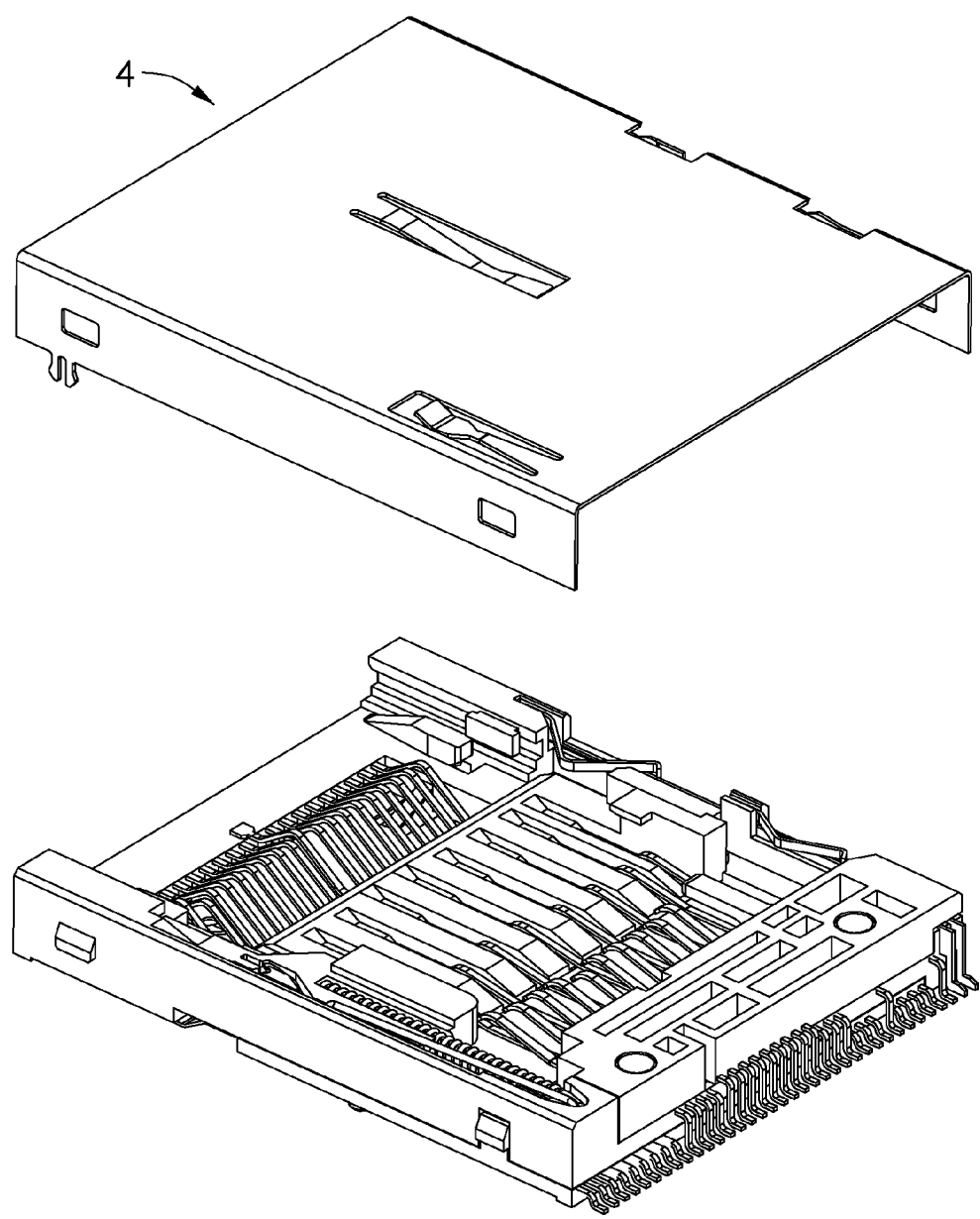
FIG. 3 is a view similar to FIG. 2, but viewed from other direction.
Figure 4:
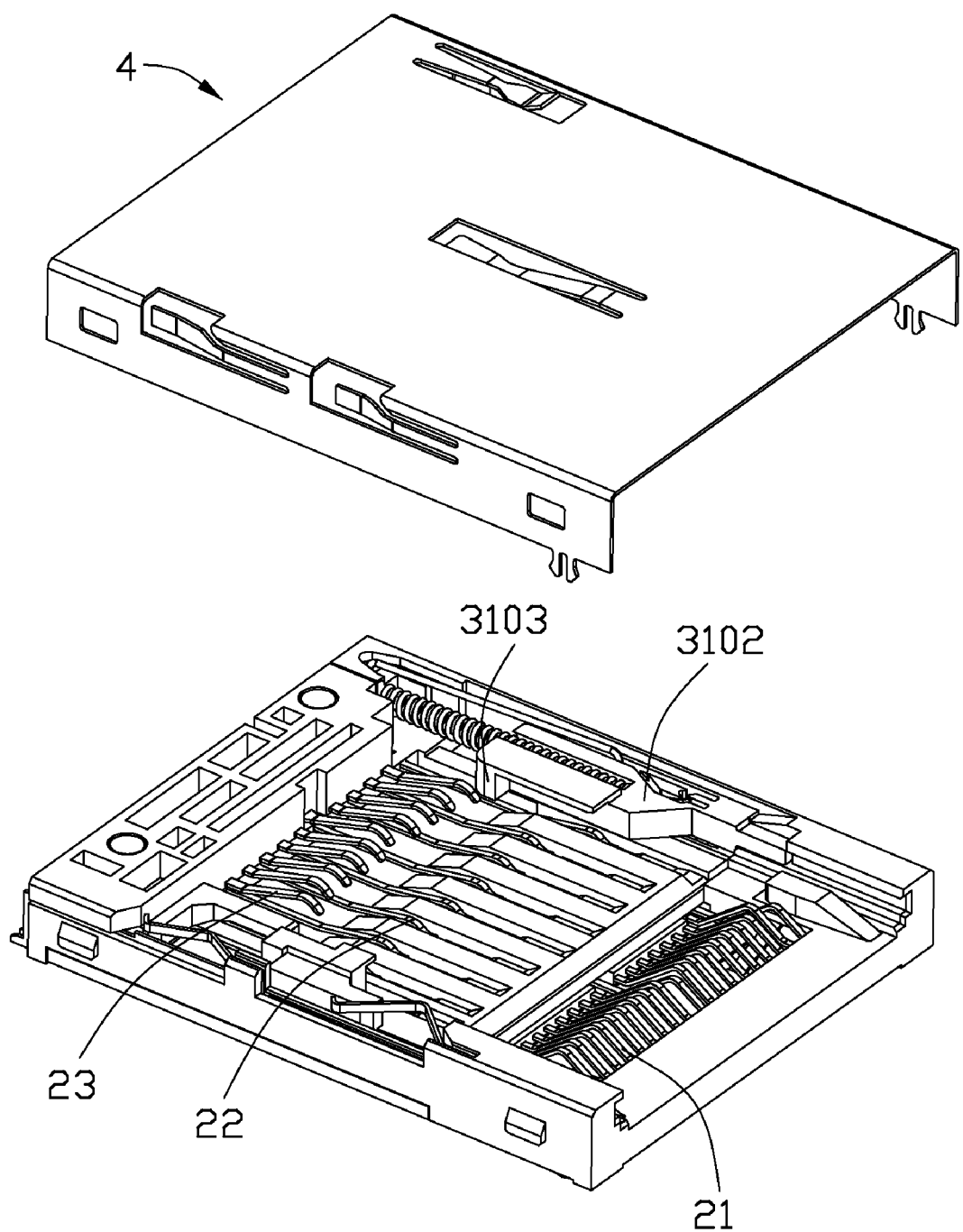
FIG. 4 is a view similar to FIG. 2, but viewed from other direction.
Figure 5:
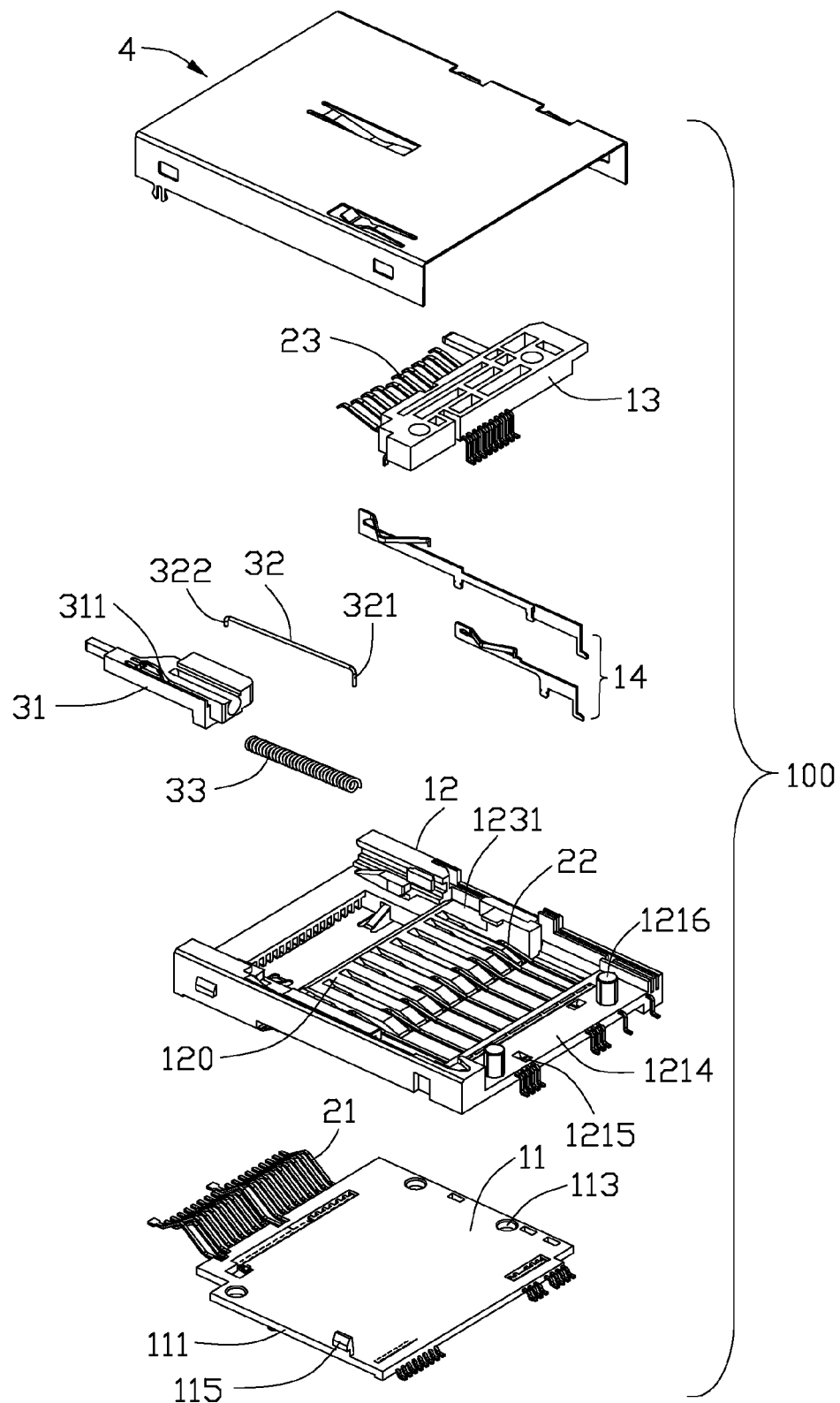
FIG. 5 is other partially assembled, perspective view of the card connector shown in FIG. 1.
Figure 6:
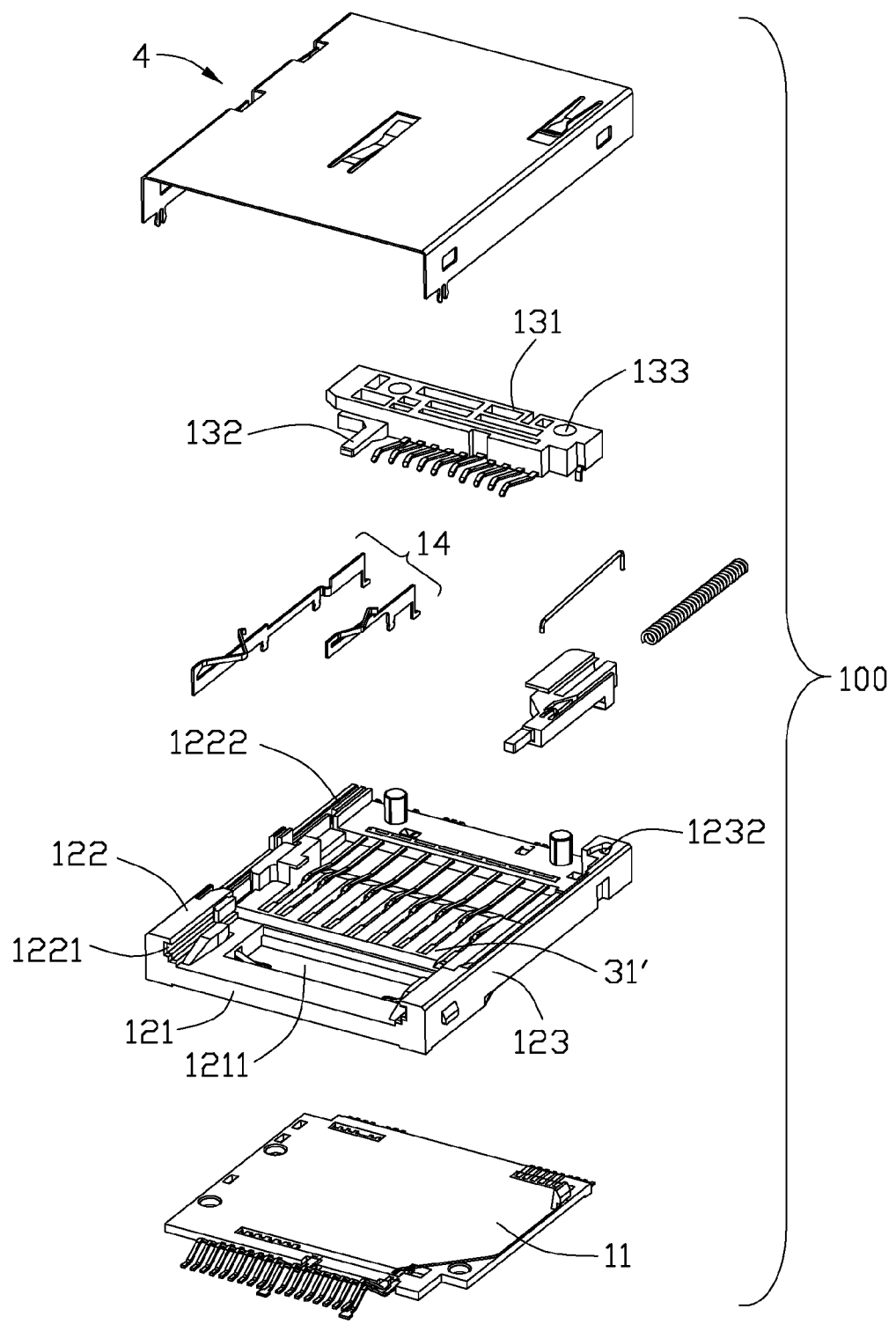
FIG. 6 is a view similar to FIG. 5, but viewed from other direction.
Figure 7:
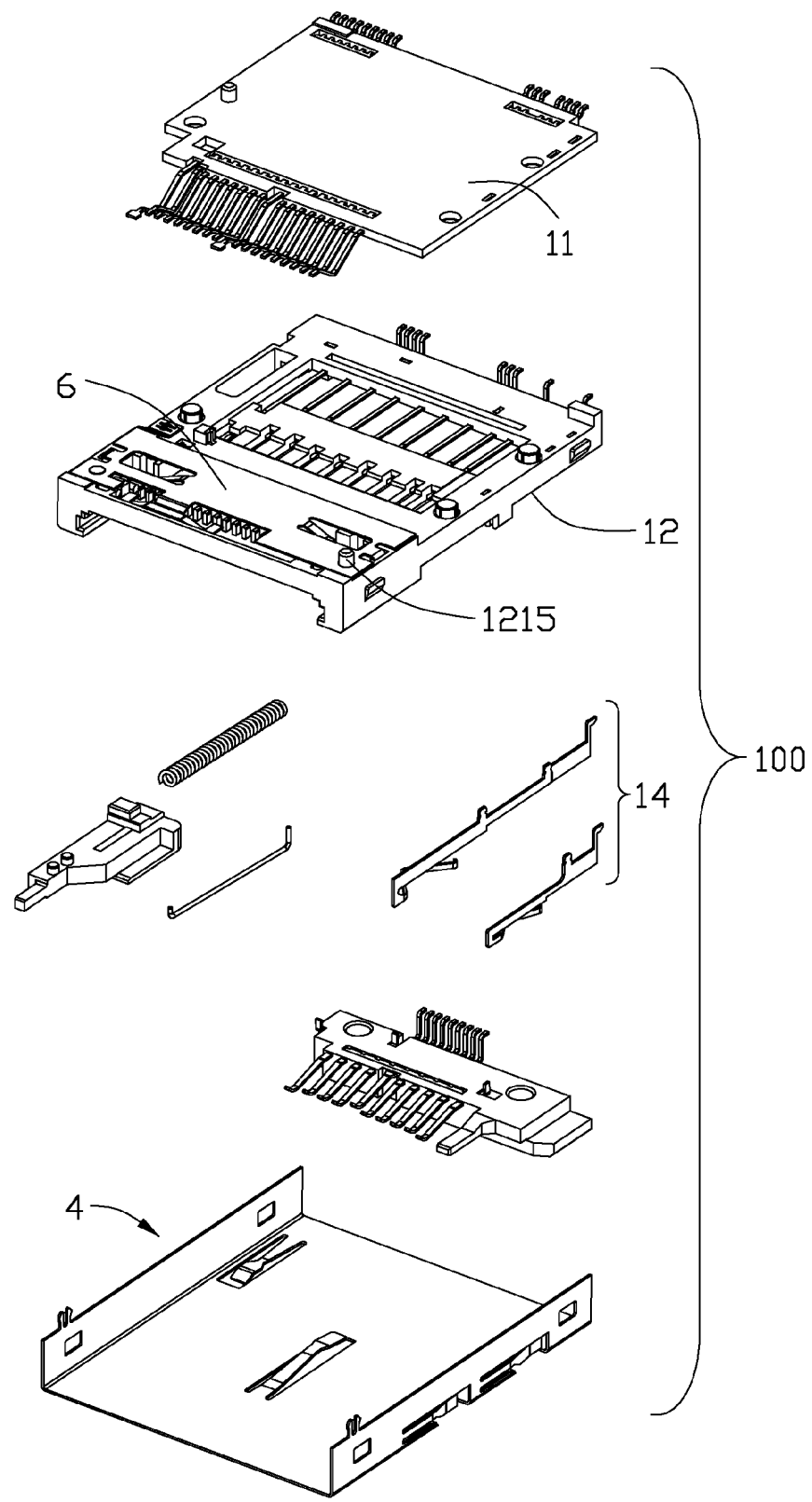
FIG. 7 is a view similar to FIG. 5, but viewed from another direction.
Figure 8:
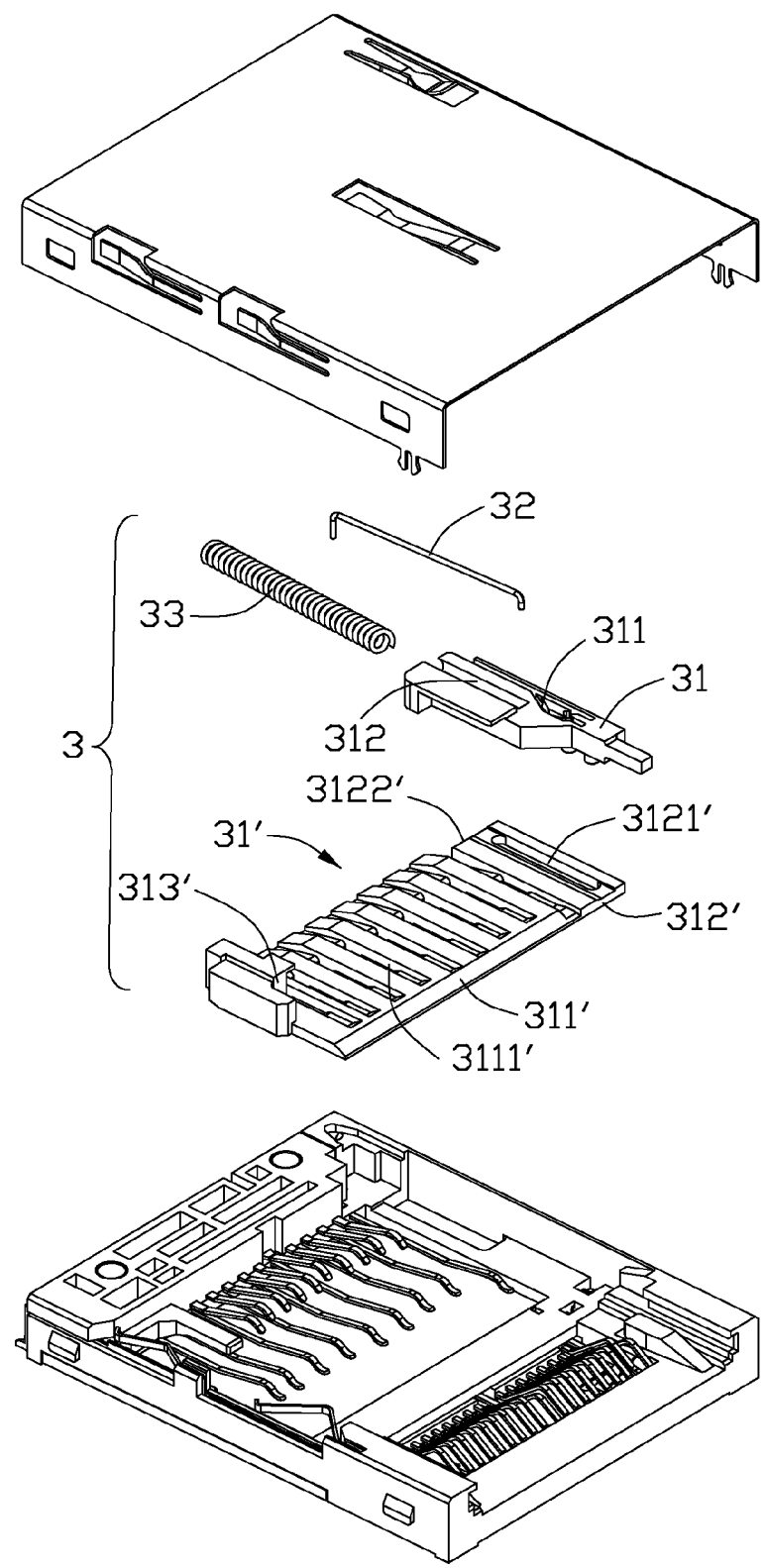
FIG. 8 is a third partially assembled, perspective view of the card connector shown in FIG. 1.
Figure 9:
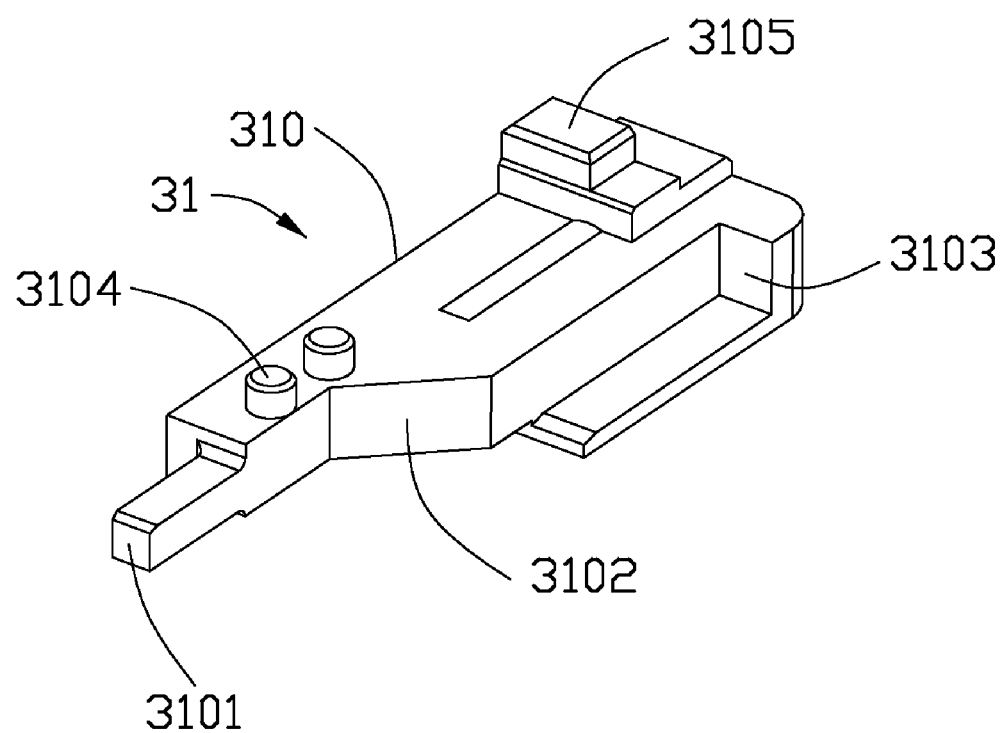
FIG. 9 is a perspective view of a first slider.
Figure 10:
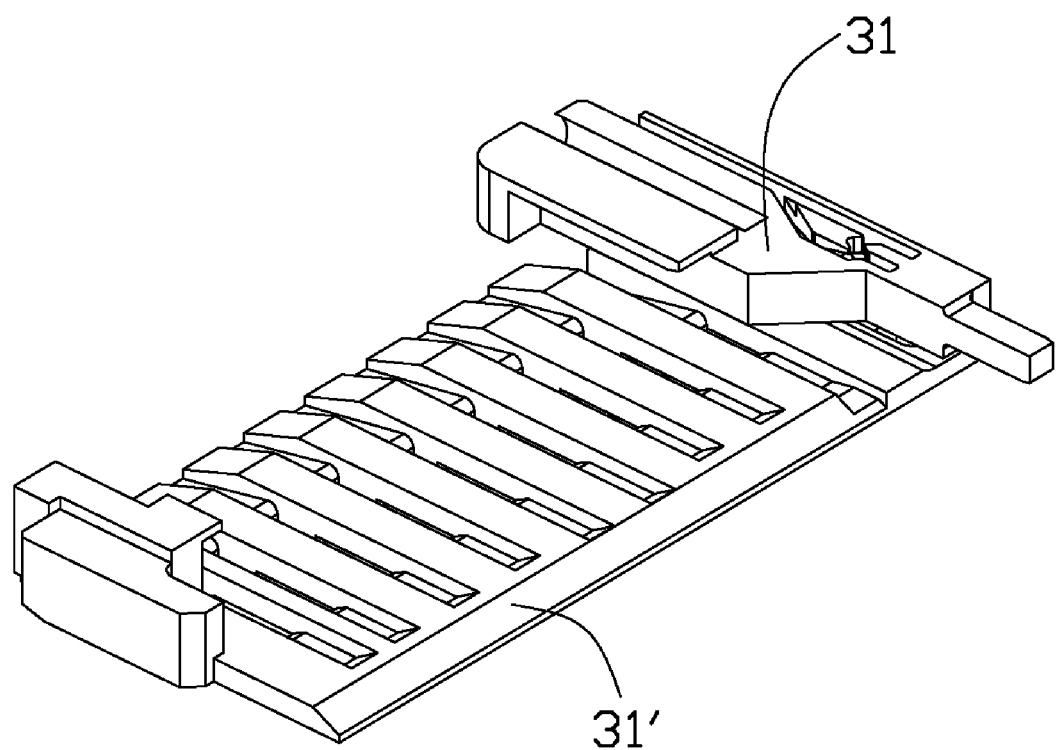
FIG. 10 is a perspective view of a second slider, with the first slider mounted thereon.
Figure 11:
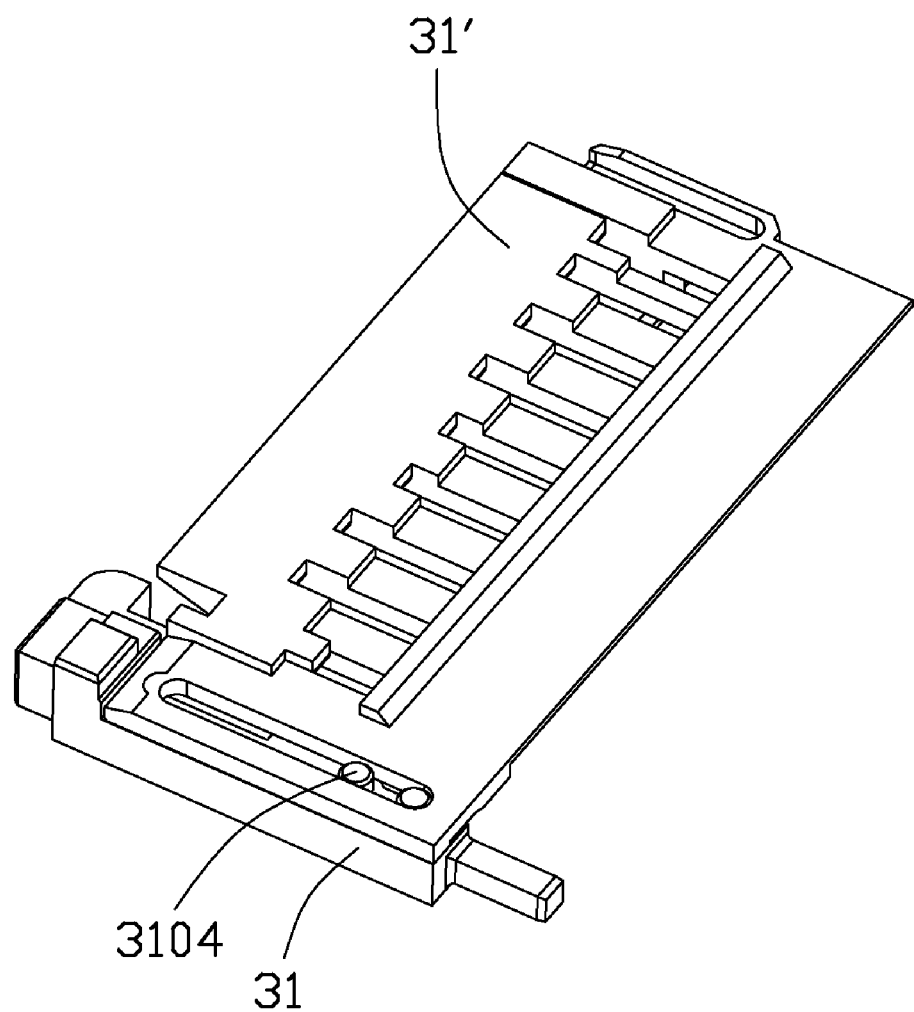
FIG. 11 is a view similar to FIG. 10, but viewed from other aspect.

Reference will now be made in detail to the preferred embodiment of the present invention.

Referring to FIGS. 1 and 12-15, a card connector 100 in accordance with the present invention is adapted for insertion of different kinds of cards 201-204. The cards 201-204 refer to MS Duo card, XD card, SD card and MMC card, respectively.

Referring to FIGS. 1-11, the card connector 100 comprises an insulative housing 1, a plurality of contacts 2 supported by the insulative housing 1, an ejecting mechanism 3 mounted to the insulaive housing 1, a metallic cover 4 shielding the insulative housing 1 and the ejecting mechanism 3, a grounding plate 6 mounted to a bottom side of a front segment of the insulative housing 1.

The insulative housing 1 includes a first housing piece 11, a second housing piece 12 and a third housing piece 13 assembled together along a up-to-down direction. The contacts 2 are divided into a set of first contacts 21, a set of second contacts 22 and a set of third contacts 23. The first contacts 21 are combined with the first housing piece 11 by insert-molding process or other manufacturing process to form a first contact module. The second contacts 22 are combined with the second housing piece 12 by insert-molding process or other manufacturing process to form a second contact module. The third contacts 23 are combined with the third housing piece 13 by insert-molding process or other manufacturing process to form a third contact module.

The first insulative housing 11 includes a board member 111, a number of positioning holes 113 defined at lateral sides of the board member 111 and a hook 115 projecting upward from one of the lateral sides of the board member 111. The set of first contacts 21 are adapted for mating with the XD card 202.

The second insulative housing 12 includes base portion 121 and a left wall 122 and a right wall 123 respectively formed at lateral sides and protruding upwardly. The base portion 121 and the left wall 122 and right wall 123 together form a card receiving space 120. A rectangular shaped cavity 1211 is defined through a front segment of the base portion 121. Two posts 1216 are formed at lateral sides of a back portion 1214 of the base portion 121, and there are two holes 1215 defined in the back portion 1214. The left wall 122 defines two corresponding contacting passages 1222 to accommodate two corresponding detecting contacts 14 therein. The right wall 123 defines a slot 1231 in a middle segment thereof and extending along a front-to-back direction. A positioning hole 1232 is defined at rear portion of the right wall 123. The set of second contacts 22 are adapted for mating with the SD card 203 or MMC card 204.

The third insulative housing 13 includes a main portion 131, a key member 132 projecting forwardly from the main portion 131. Two mounting holes 133 defined at lateral segments of the main portion 131. The set of third contacts 23 are adapted for mating with MS Duo card 201.

The ejecting mechanism 3 includes a first slider 31, a second slider 31', a follower 32 and a spring 33.

The first slider 31 has a longitudinal body 310 which has a first engaging portion 3101, a second engaging portion 3102 and a third engaging portion 3103. The first engaging portion 3101 has a free end projecting forwardly. The second engaging portion 3102 has an oblique contacting side. The third engaging portion 3103 is a hook structure. The third engaging portion is about L-shaped viewed from a top side. There are two first aligning members 3104 formed on a bottom side of a front segment of longitudinal body 310, and a second aligning member 3105 formed on a bottom side of a back segment of the longitudinal body 310. The two aligning members 3104 are two cylindrical posts 3104 which are spaced apart from each other and disposed along a front-to-back direction. The longitudinal body 310 defines a heart-shaped slot 311 on a top side thereof. In addition, a mounting slot 312 is recessed forwardly from a back side of the longitudinal body 310.

The second slider 31' has a transversal platform 311', a supporting portion 312' connected to a right side of the platform 311' and an engaging portion 313' protruding upwardly from a left side of the platform 311'. In addition, there are a number of longitudinal contact grooves 3111' defined in the platform 311' to accommodate the set of second contacts 22. A longitudinal guiding slot 3121' is located on the supporting portion 312'. Also, a cutout 3122' is defined in a back segment of the supporting portion 312'. The set of third contacts 23 are located behind the second slider.

The first slider 31 is mounted to the supporting portion 312' of the second slider 31', with the two first aligning members 3104 received in the longitudinal guiding slot 3121' and capable of moving therein along the longitudinal direction. The second aligning member 3105 is accommodated in the cutout 3122' and capable of sliding therein along the longitudinal direction.

The slider 31 is also mounted to the slot 1231 and capable of sliding therein along the front-to-back direction. The spring 33 forwardly biases/pushes the first slider 31, independent from the second slider 31', or together with the second slider 31', with regard to relative position. The follower 32 has a rear hook 321 locking into the positioning hole 1232 and a front hook 322 capable moving in a heart-shaped slot 311 defined in the slider 31.

Figure 12:
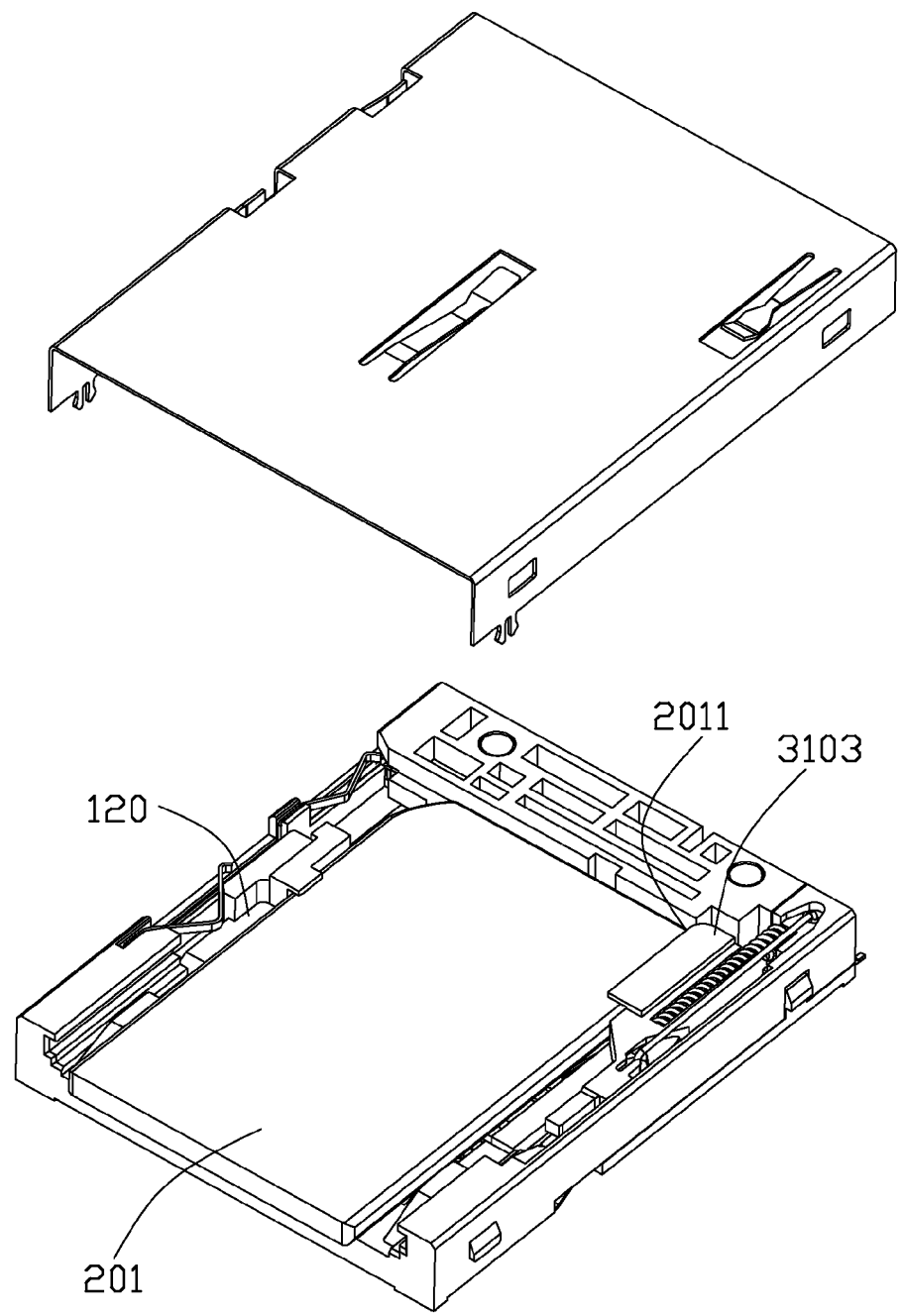
FIG. 12 shows a status after the MS Duo card inserted into the card connector.

Referring to FIG. 12, which illustrates how the MS Duo card 201 is ejected by the ejecting mechanism 3. The MS Duo card 201 is only carried by the first slider 31, with a right corner 2011 of a mating segment of the MS Duo card 201 only engaged with the third engaging portion 3103 and moving in the card receiving space 120 along the longitudinal direction. The first slider 31 moves on the second slider 31', and the second slider 31' located at its original position and does not follow the MS Duo card 201 and the first slider 31 moving. Thus, the MS Duo card 201 does not work with the second slider 31'.

Figure 13:
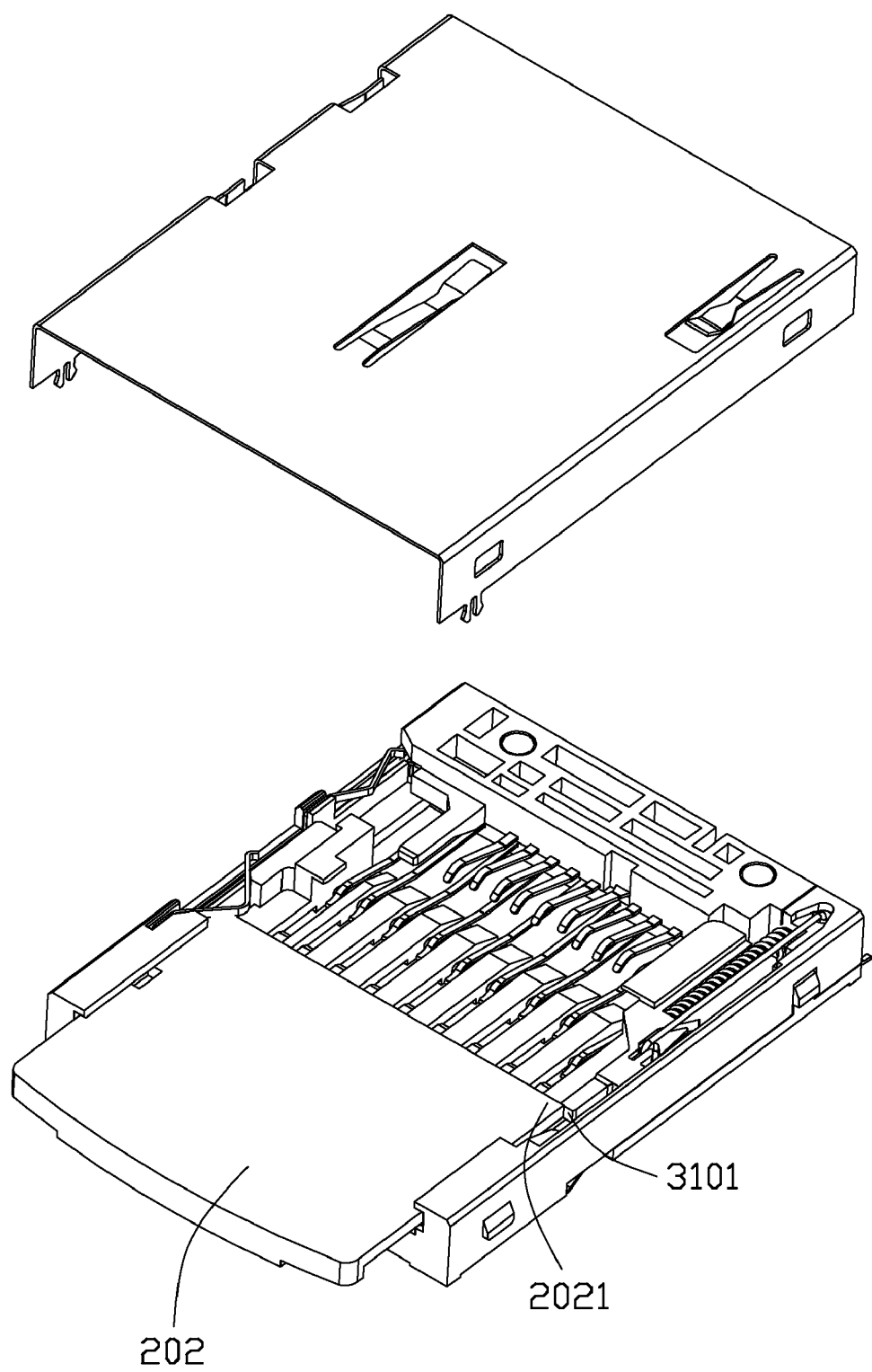
FIG. 13 shows a status after the XD card inserted into the card connector.

Referring to FIG. 13, which illustrates how the XD card 202 is received in the card receiving space 120. The XD card 202 is disposed in front of the first slider 31, with right corner 2021 thereof forwardly pushed by the first engaging portion 3101 of the first slider 31 and independent from the second slider 31'.

Figure 14:
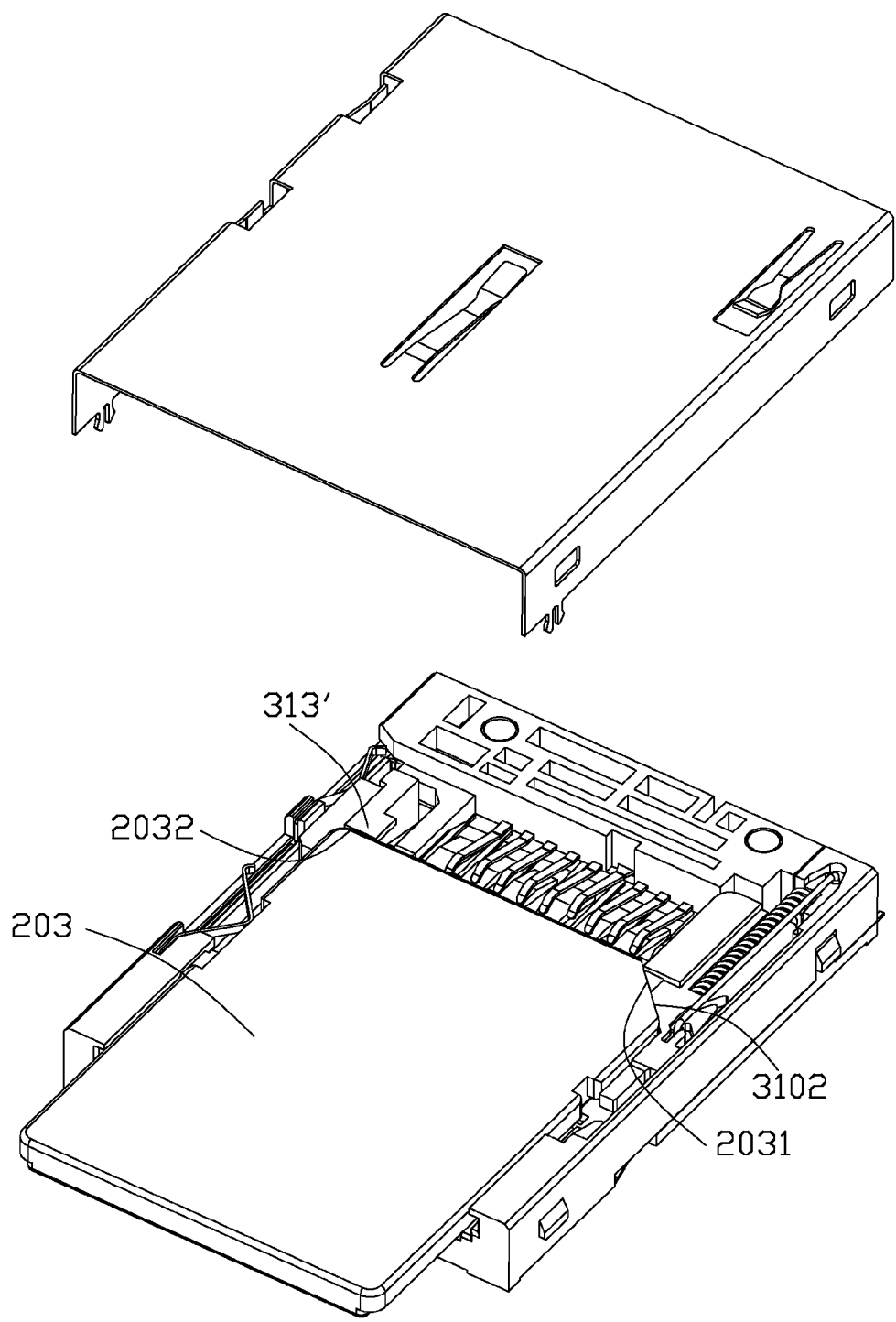
FIG. 14 shows a status after the SD card inserted into the card connector.

Referring to FIG. 14, which illustrates how the SD card 203 is ejected by the ejecting mechanism 3. The SD card 203 is carried by both the first slider 31 and the second slider 31', with a right corner 2031 of a right side of a mating segment of the SD card 203 engaged with the second engaging portion 3102 and a left corner 2032 of the mating segment of the SD card 203 hooked by the engaging portion 313' of the second slider 31'. In addition, the SD card 203 is placed on the transversal platform 311', which can lift/raise the second contacts 22 to be exposed outward of the contact grooves 3111', while moving backwardly. Therefore, the SD card 203 moving in the card receiving space 120 along the longitudinal direction, together with the first slider 31 and the second slider 31'. The SD card 203 is wider than the MS Duo card 201.

Figure 15:
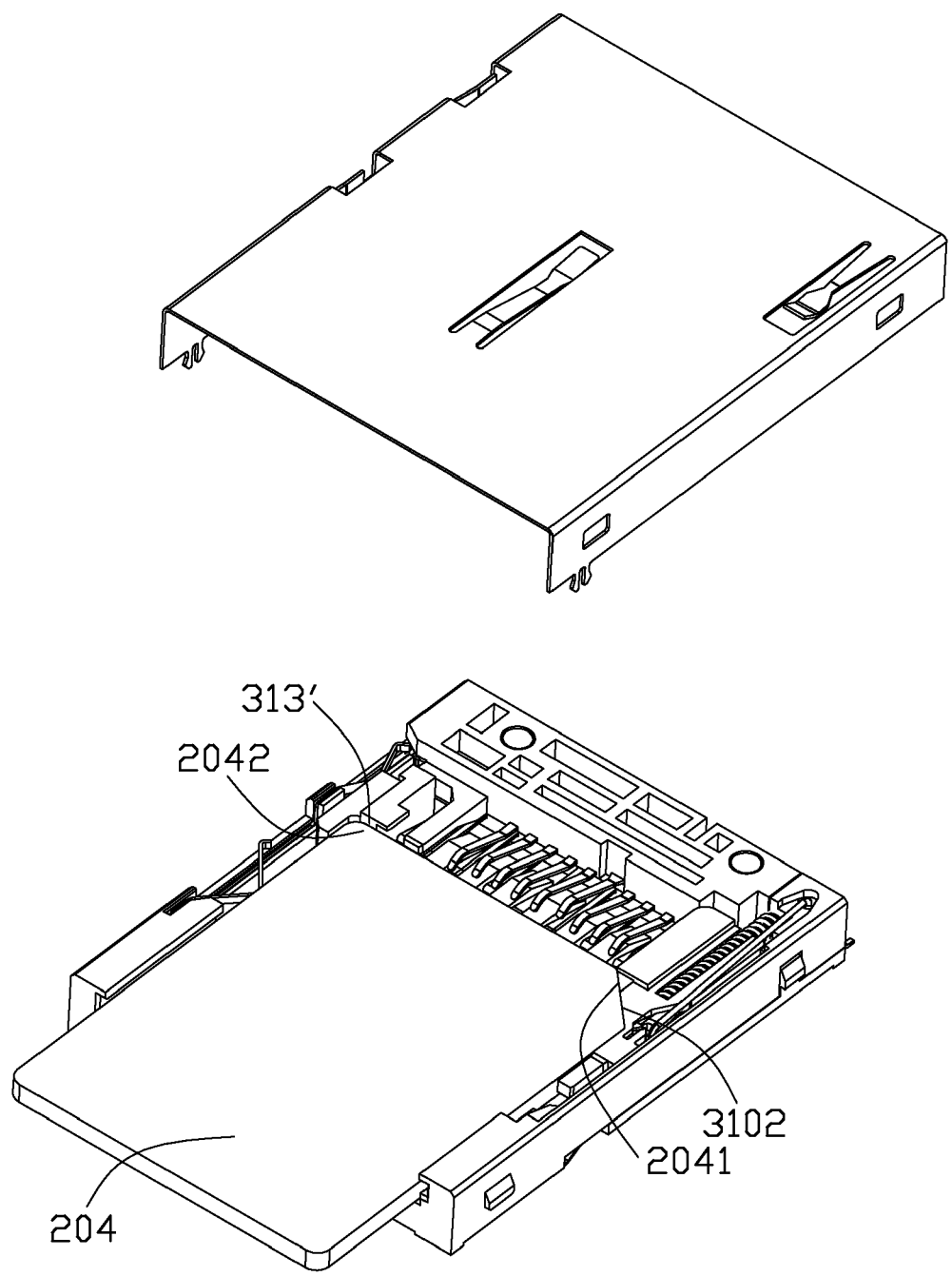
FIG. 15 shows a status after the MMC card inserted into the card connector.

Referring to FIG. 15, which illustrates how the MMC card 204 is ejected by the ejecting mechanism 3. The MMC card 204 is carried by both the first slider 31 and the second slider 31', with a right corner 2041 of a mating segment of the MMC card 204 engaged with the second engaging portion 3102 and a left corner 2042 of the mating segment of the MMC card 204 hooked by the engaging portion 313' of the second slider 31'. In addition, the MMC card 204 is placed on the transversal platform 311', which can lift/raise the second contacts 22 to be exposed outward of the contact grooves 3111', while moving backwardly. Therefore, the MMC card 204 moving in the card receiving space 120 along the longitudinal direction, together with the first slider 31 and the second slider 31'. The MMC card 204 is wider than the MS Duo card 201.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector, comprising:
    an insulative housing defining a card receiving space;
    a plurality of contacts supported by the insulative housing and accommodated in the card receiving space, said the plurality of contacts divided into two sets and arranged along a longitudinal direction, said contacts adapted for mating with a first type card and a second type card, respectively; and
    an ejecting mechanism mounted to the insulative housing, the ejecting mechanism including a first slider, a second slider, a follower and a spring, the first slider mounted to the second slider and capable of moving on the second slider to carry one of the two type cards, and the first slider and the second slider move together to carry the other of the two cards.

2. The card connector as claimed in claim 1, wherein the first slider has a longitudinal body with a first engaging portion and a second engaging portion.

3. The card connector as claimed in claim 2, wherein the longitudinal body of the first slider defines a heart-shaped on a top side thereof.

4. The card connector as claimed in claim 3, wherein the follower has a rear hook locking into a positioning hole located in the insulative housing and a front hook capable of moving in a heart-shaped slot of the first slider.

5. The card connector as claimed in claim 2, wherein the second slider has a transversal platform, a supporting portion connected to a right side of the platform and an engaging portion protruding upwardly from a left side of the platform.

6. The card connector as claimed in claim 5, wherein the first slider is mounted to the supporting portion of the second slider.

7. The card connector as claimed in claim 6, wherein there is a longitudinal guiding slot located on the supporting portion, and there is at least one first aligning member formed on a bottom side of a front segment of the longitudinal body and received in the longitudinal guiding slot.

8. The card connector as claimed in claim 7, wherein there are two aligning members arranged along the longitudinal direction.

9. The card connector as claimed in claim 1, wherein the spring forwardly biases the first slider.

10. A card connector adapted for mating at least two types of cards, comprising:
   an insulative housing defining a card receiving space;
      a plurality of contacts supported by the insulative housing and accommodated in the card receiving space, said plurality of contacts divided into two sets and arranged along a longitudinal direction and adapted for mating with the two types cards, respectively; and
      an ejecting mechanism mounted to the insulative housing, the ejecting mechanism including a first slider, a second slider, a follower and a spring, and wherein one of the card is carried by the first slider and independent from the second carrier, and the other card carried by the first slider and the second slider.

11. The card connector as claimed in claim 10, wherein the first slider is mounted to the second slider and capable of moving on the second slider along a longitudinal direction.

12. The card connector as claimed in claim 10, wherein there is a longitudinal guiding slot defined in the second slider, and there is a first aligning member formed on the first slider and received in the longitudinal guiding slot.

13. The card connector as claimed in claim 12, wherein the second slider together with the first slider move in the card receiving space along the longitudinal direction.

14. The card connector as claimed in claim 10, wherein the card carried by the first slider and the second slider is wider than the card only carried by the first slider.

15. The card connector as claimed in claim 10, wherein there are a plurality of contact grooves defined in the second slider to accommodated the set of contacts for mating with the card carried by the first slider and the second slider.

16. The card connector as claimed in claim 10, wherein the other set of contacts for mating with the card only carried by the first slider are located behind the second slider.

17. A card connector for mating with first and second type cards, comprising:
   an insulative housing defining a card receiving space;
   first and second sets of contacts disposed in the housing for mating with said first and second type cards, respectively;
   a first slider essentially positioned on and moveable relative to the housing in a front-to-back direction, said first slider equipped with a combination of a spring constantly urging the first slider forwardly and a follower moving along a cycled slot; and
   a second slider essentially positioned on and moveable relative to the housing in the front-to-back direction, the second slider being associatively movable along with the first slider; wherein
   the first slider back and forth moves relative to the housing in the front-to-back direction by actuation of the first type card under condition that the second slider stays in the front original position and ejection of the first type card is performed by the first slider solely while the second slider back and forth moves relative to the housing between front original and rear actuated positions in the front-to-back direction by actuation of the second type card under condition that the first slider is also back and forth moveable relative to the housing simultaneously so as to perform ejection of the second type card.

18. The card connector as claimed in claim 17, wherein the second set of contacts are up and down deflected in a vertical direction perpendicular to said front-to-back direction by back-and-forth movement of the second slider in said front-to-back direction.

19. The card connector as claimed in claim 17, wherein said first slider includes a first abutment section for engagement with the first type card, and the second slider includes a second abutment for engagement with the second type card under condition that said first abutment section and said second abutment section are respectively located on two opposite sides of the housing in a transverse direction perpendicular to both said front-to-back direction and said vertical direction.

20. The card connector as claimed in claim 17, wherein said first slider is moveable relative to the second slider in said front-to-back direction so as to allow said second slider to be in a either synchronous or asynchronous condition with regard to the first slider.

* * * * *